United States Patent [19]
Peltzer

[11] Patent Number: 5,708,763
[45] Date of Patent: Jan. 13, 1998

[54] TILING FOR BIT MAP IMAGE

[75] Inventor: Bruce Alan Peltzer, Lexington, Ky.

[73] Assignee: Lexmark International, Inc., Lexington, Ky.

[21] Appl. No.: 171,074

[22] Filed: Dec. 21, 1993

[51] Int. Cl.$^6$ ................................................. H04N 1/40
[52] U.S. Cl. ........................................... 395/115; 395/114
[58] Field of Search ................................. 395/115, 114, 395/117, 111, 133; 358/448

[56] References Cited

U.S. PATENT DOCUMENTS

| | | | |
|---|---|---|---|
| 4,941,193 | 7/1990 | Bernsley et al. | 382/56 |
| 5,131,080 | 7/1992 | Fredrickson | 395/164 |
| 5,146,547 | 9/1992 | Beck et al. | 395/116 |
| 5,150,454 | 9/1992 | Wood et al. | 395/114 |
| 5,193,008 | 3/1993 | Frazier et al. | 358/298 |
| 5,204,916 | 4/1993 | Hamilton, Jr. et al. | 382/41 |
| 5,295,235 | 3/1994 | Newman | 395/133 |
| 5,297,217 | 3/1994 | Hamilton, Jr. et al. | 395/111 |
| 5,307,180 | 4/1994 | Williams et al. | 358/448 |
| 5,315,696 | 5/1994 | Case et al. | 395/133 |
| 5,500,928 | 3/1996 | Cook et al. | 395/133 |

FOREIGN PATENT DOCUMENTS 2214038  8/1989  United Kingdom ............ G06F 15/66

OTHER PUBLICATIONS

Computer Architecture News, vol. 20, No. 4, Sep. 1992, article entitled "Memory Management Support for Tiled Array Organizatiin", by Gary Newman, pp. 22–30.

Inform, Mar. 1989, article entitled "Tiling, Turning Unwieldy Drawings Into Neat Little Packets", by Louis H. Sharpe II, pp. 17, 18 and 20.

Technical Report for Information and Image Management, AIIM TR14–1988, entitled "Interchange of Tiled Raster Documents", pp. i–iii and 1–18.

*Primary Examiner*—Raymond J. Bayerl
*Assistant Examiner*—Steven P. Sax
*Attorney, Agent, or Firm*—Ronald K. Aust; John J. McArdle, Jr.

[57] ABSTRACT

A rasterizer described in relation to a printer apparatus for defining a page bit map, for a page to be printed, in blocks wherein there are multiple blocks across the width of the page and multiple blocks down the length of the page. A programmed microprocessor executes routines to render objects defined by received or processed drawing orders into blocks of the bit map and also to store drawing orders in display lists, each being associated with a block of the bit map. The blocks are rasterized, including rendering the display lists, on a row by row basis for serialization of the rows of blocks of the bit map to a print engine for printing.

11 Claims, 14 Drawing Sheets

| FIG. 5A |
| FIG. 5B |

FIG. 15

| BLOCK NUMBER | BIT MAP POINTER | DISPLAY LIST POINTER | COMPRESSION TYPE |
|---|---|---|---|
| 1 | ~~ | ~~ | ~~ |
| 2 | ~~ | ~~ | ~~ |
| 3 | ~~ | ~~ | ~~ |
| 4 | ~~ | ~~ | ~~ |
| 5 | ~~ | ~~ | ~~ |
| 6 | ~~ | ~~ | ~~ |

TILING FOR BIT MAP IMAGE

BACKGROUND OF THE INVENTION

This invention is related to bit maps, or raster images, such as for a printed page or display, and more particularly concerns improved processing and handling of such images.

Memory is a significant cost component of the electronics for raster devices such as computer displays, printers and scanners. Personal computers may have a megabyte of video memory, while a printer with a resolution of 300 dots per inch needs slightly more than one megabyte of bit map space for an 8½×11 inch page. In the case of a printer, this one megabyte of memory is merely sufficient to represent two intensities (on and off) for a single color. Multiple intensities (gray scales) multiply the memory size, as does the addition of further colors as in the case of a multicolor printing device. Of course, the memory requirements also increase with increased resolution.

In the case of a printer, for example, one approach to saving memory is to use a display list, in which a series of display commands is stored in the order received (such as from an attached personal computer). These commands would include commands to draw a line from one point to another or to move the "cursor" to a new location. The list of commands is stored until all of the commands for a page to be printed are received. In order to print the page, the commands are then executed to put the bit map image into the page bit map. For there to be a saving of memory, the page is typically rendered in sections or "swaths", with the entire display list being processed and the resultant image clipped to the area which is being rasterized. This is repeated for each swath of the page in sequence from the top of the page to the bottom.

One difficulty with this display list approach is that the display list may become quite large, particularly if the data is a bit map, or a scanned image. Second, the work required to process the list for each area of the page is significant, and perhaps unbounded with an arbitrarily large display list. Also, this list must be processed quickly enough to keep the data flowing to the print engine of the printer at the rate required.

An alternative to the display list approach is to divide the bit map into rectangular pieces, known as blocks or tiles. Each block, initially, is represented only by a data structure indicating the form and location of the associated raster data. When work on a blank page begins, the form of each block is non-existent, and it has no raster memory associated with it. As data is written to the bit map, raster memory is associated with each block involved in the operation, and the operation is performed on all the affected blocks.

To further reduce the total memory requirements, blocks containing data may be compressed when they are not involved in an operation. The compression algorithm may vary by block by changing the "form of compression" field associated with the block data structure. This would allow different data types to be compressed using different algorithms or to trade off between algorithm speed and the amount of memory required after compression. The compressed data in a compressed block is then decompressed before any subsequent operations on that block. Also, the blocks are decompressed as needed in preparation for printing and cleared back to their initial state when the page is no longer needed.

To reduce the time spent compressing and decompressing raster data, a number of recently used blocks may be stored in decompressed form. If consecutive operations on a page are typically made in localized areas of the page, many operations may be performed on a block before it is compressed, and it may not be decompressed again until the time to print.

There are a number of memory savings associated with this tiling and compression approach to rasterization. First, unused blocks have almost no memory associated with them. The number of unused blocks depends on the block size and the blank regions of a given page. In the case of a color page stored in a planar fashion with the raster data associated with each color kept separately, there are often many unused blocks, as most areas have few colors. Also, those blocks not recently used are compressed, with the savings here varying based on the algorithms used and the data being compressed.

It has been found in tiling and compression systems that where the memory available for bit maps is insufficient to contain at least a full page of one color of uncompressed data, processing text provides a burden on the processing speed of the system. This is due to the additional processing required to compress and decompress blocks while rasterizing text.

In accordance with one aspect of the invention, it has been found that adding a display list to each block in a blocking and compression scheme maintains the complexity advantages of the blocking approach, while recovering the text performance that suffers in the handling of text.

Both blocking/compression and display list processing honor the ordering of received data. This is important for datastreams in which areas of the page may be overwritten by subsequent commands. When a display list is added into a blocking/compression system, however, there are now two sets of data. Each is ordered by itself, but the order of the two sets must also be maintained relative to one another.

One possible way to do this would be to limit each block's representation to be either bit map, compressed bit map or display list. That is, if a block contains exclusively data which can be put in a display list, that format would be used for the block. If any operations could not be handled on a display list, the block's display list, if any, would be rasterized, the new operation would be performed, and the block would subsequently be stored in bit map (or compressed bit map) form.

Another possibility would be to restrict the display list of each block to handle a single "color". Color, in this context, may be "all pels on", "all pels off", a dither pattern, or an intensity value (for continuous tone printers). As long as subsequent operations on a given block were in the same color as the display list, a bit map representation of the non-display list operations could coexist with the display list since their order would not be important. Thus, only operations in a different "color" would force the display list to be rasterized.

An extension to this would be to allow both display list and bit map representations of a block to coexist, with the understanding that the final result would be produced by starting with the bit map representation and then performing the operations specified by the display list. Non-display list commands, then, would cause a preceding display list to be rasterized, but a display list could be generated even if a block already existed in bit map form. This would permit the handling, for example, of text on a shaded background.

In the embodiment to be described herein, this final approach is used. Each block is represented by a compression type, a pointer to either the compressed or decompressed bit map data, and a pointer to a display list. The display list, in turn, is made up of a linked list of characters or fill areas drawn by turning all pels on or all pels off (black or white in the case of a monochrome printer). For each character, the character position is stored along with a pointer by which the character size and data are accessed. For each area, the position and size and shape information is stored. Such characters and areas shall be collectively referred to herein as text.

All bit map operations are subdivided to operate on one block of bit map data at a time. A fill area, or a character which is not clipped, or which is clipped only by the limits of the current block, is not rasterized. Instead, its starting position and (for characters, a pointer to) its size and its data are added to the block's display list. To process other operations, a function is called to return the address of the decompressed bit map data for this block. This may involve allocating and erasing a new area of memory or decompressing an existing block, and in order to support a display list, executing and deleting an existing display list.

This method of operation continues until a page is to be printed. Each band, or swath, of the page must be completely rasterized in turn. This involves, for each block in each swath, decompressing or copying any bit map representation and then processing the display list.

While the embodiment disclosed herein only puts text on the display list, any operation which could be more compactly described in some form of display list could be handled in the same fashion. The presently disclosed embodiment could also be extended to handle all primary colors or even shades of color (the latter requiring a halftone cache for binary printers).

BRIEF DESCRIPTION OF THE DRAWINGS

FIG. 15 is a diagrammatic illustration of a block pointer table maintained in memory of the printer of FIG. 13.

DETAILED DESCRIPTION

The present invention is applicable to systems in which objects are processed in a representational form. The objects may be alphanumeric characters, bit map images, geometric shapes or other items. The objects are defined by "drawing orders", such as for a display or a printed page. Representations of the objects are provided in a notional domain made up of domain sections arranged in a multidimensional array. Some or all sections may be presented in rasterized form for printing, display, transmission or further processing.

Figure 13:
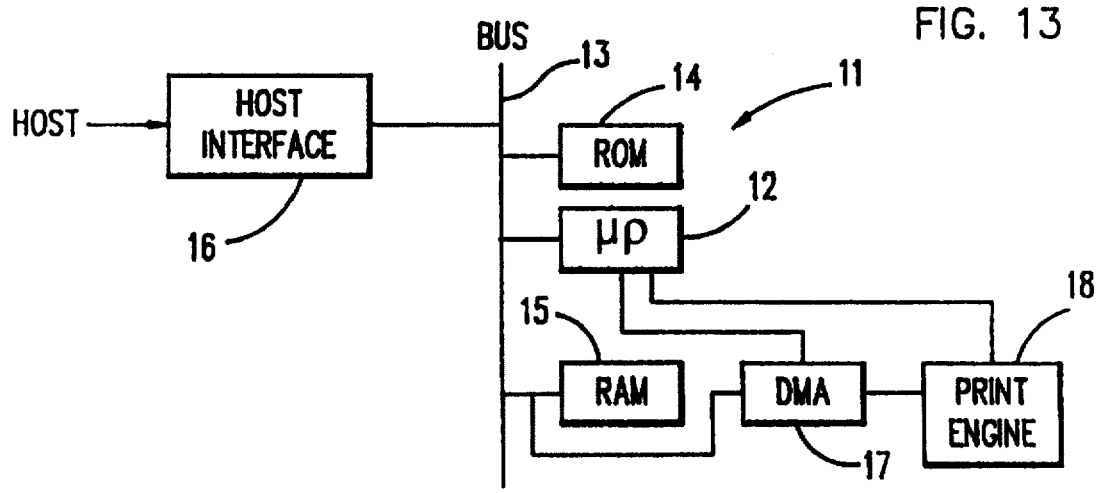
FIG. 13 is a block diagram of a printer operative to execute the routines of FIGS. 1–12.

The invention will be described herein in relation to a printer in which drawing orders are rasterized into a tiled bit map for ultimate serialization to a print engine. With reference to FIG. 13, such a printer 11 includes a microprocessor 12 coupled by a bus 13 to a read-only-memory 14 and a random access memory 15. The read-only-memory 14 contains the instructions for routines executed by the microprocessor 12, including the rasterization routines to be described hereinafter. The random access memory 15 is used to store, among other things, the bit map representations of uncompressed blocks, or tiles, in the bit map as well as various sets of data representing compressed blocks and display lists for blocks.

The drawing orders which are rasterized by the microprocessor 12 are supplied onto the bus 13 through a host interlace 16 from a host computer. In many cases, the form of the drawing commands which might be supplied through the host interface 16 onto the bus 13 may require further processing by the microprocessor 12 before rasterization. This would be accomplished by operation of the microprocessor in executing appropriate interpreter commands in the ROM 14 and storing the thus-produced drawing orders in the RAM 15. The presently described embodiment of the invention concerns the operation of the printer 11 in the rasterization process, and therefore only that portion of the microprocessor operation will be described in detail.

Following rasterization, after an image is created in bit map form for a page to be printed, at least a first swath of the page is appropriately located in the RAM 15, and direct memory access (DMA) hardware 17 transfers the bit map information to a print engine 18, such as an electrophotographic print engine for the production of a printed page.

Other system architectures are, of course, possible. For example, all block and display list data can be produced on the host computer for transmission to the memory 15; and the microprocessor 12 could then be operable to merely rasterize blocks for serialization of bit map data to the print engine 18. Alternatively, bit map data for serialization could also be prepared on the host and sent to the memory 15 to be coupled to the print engine 18, with or without the assistance of a microprocessor such as 12.

Figure 14:
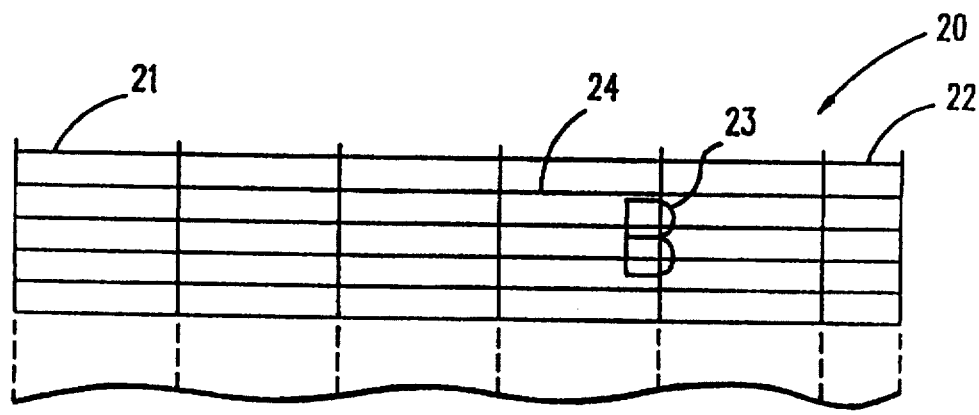
FIG. 14 is a diagrammatic illustration of a portion of a "tiled" page.

With regard to rasterization, when the microprocessor initializes for rasterization of a page, a notional subdivision is created of a page such as 20 (FIG. 14) containing blocks, or tiles, such as 21. Preferably, the blocks 21 are of equal size except around edges of the page, where smaller blocks such as 22 are formed. In one form of the invention, the blocks are 512 pels wide by 128 pels high. The number of blocks on a page depends not only on the size of the page and of the blocks, but also the resolution of the image to be printed.

When initializing, the microprocessor forms a table such as that shown in FIG. 15 containing the compression type, and pointers to bit map data and display list data, if any, associated with each block. At the outset, these would indicate that no bit map or display list data is present.

The basic operation of the processor during rasterization is to render objects into the blocks. For example, a character such as the letter "B", item 23 in FIG. 14, would be rendered into six blocks, beginning with the block number 24. The object being rendered into a block or blocks could be a character, or it could be an image or a fill pattern, or a non-character "text" object.

Figures 5, 5A:
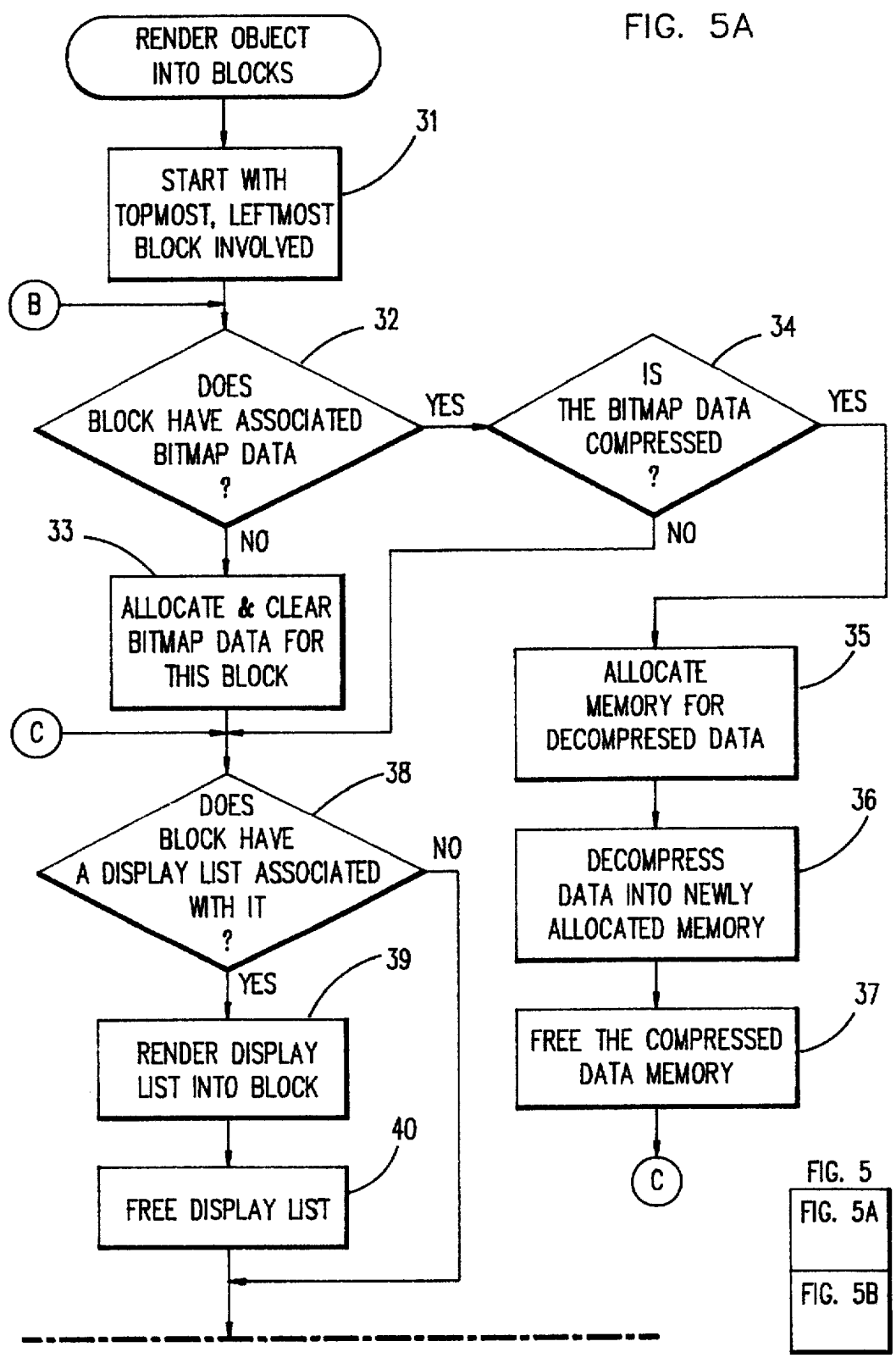
FIG. 5 is a flowchart of the routine for rendering various objects into blocks of a bit map.
Figure 5B:
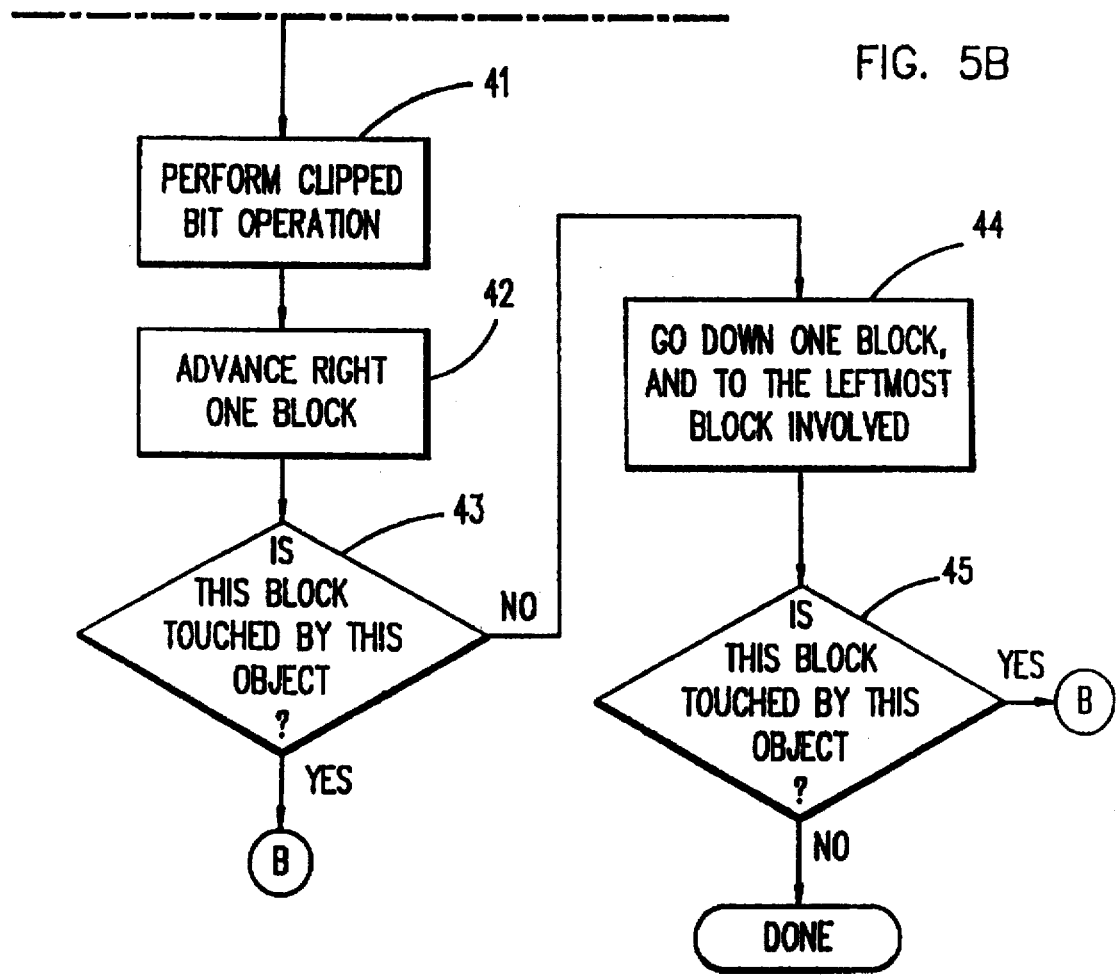

With reference to FIG. 5, the routine for rendering an object into the blocks, whether that object be an image, a text object, or a fill pattern, begins (31) with the topmost, leftmost block involved. This would be the topmost, leftmost block into which the object is to be placed. The processor next determines (32) if this block has associated bit map data. If there is no bit map data for this block, memory space is allocated and cleared (33) to represent the bit map data for this block. If there is associated bit map data, the processor determines (34) if this data is compressed. If it is not compressed, the logic flow is to the same point as the output of the block 33. If there is compressed bit map data for the block under consideration, the processor allocates (35) memory for decorepressed data. The processor then decompresses (36) the compressed data into the newly allocated memory. After the decompressed data is placed in the newly allocated memory, the processor frees (37) the memory that was used for the compressed data. The logic flow is then to the same point as the output of the block 33.

At the output of the block 33, through whichever path this location is reached, there is now a decompressed memory area available for rendering the object into the block. The processor next determines (38) if the block has a display list associated with it. If there is no display list, the processor proceeds to the step 41, and if there is a display list this must be rendered into the block first. The bit map data and display list decisions of steps 32 and 38 are made by checking the table of FIG. 15.

If there is a display list, the processor renders (39) the display list into the block. This operation will be described subsequently, but, substantially, all of the entries on the display list are sequentially performed to make all of the required alterations to the bit map data of the current block. After the display list has been rendered into the block, the processor frees (40) the display list memory, as will also be described in more detail hereinafter.

After the existing bit map data is available, including the rendering of the display list if necessary, the processor then performs a clipped bit block transfer operation (41) to transfer the bit map data affecting that block for the object being rendered into the block. The processor then advances (42) to the right one block, and determines if this block is touched (43) by the object being rendered. If not, the processor goes down (44) one row of blocks and to the leftmost block involved with the object being rendered. The processor then determines (45) if this block is touched by the object. If not, the object will have been fully rendered into the affected blocks. If this leftmost block in the next row is touched by the object being rendered, the processor returns to the logic flow before the decision 32 to render the necessary portions of the object into the block. In a similar fashion, if the result of the decision 43 is that the block under consideration is touched by the object, the processor also returns to the input to the decision point 32 to render the relevant parts of the object into the block under consideration.

In this way, the processor moves from left to right and down the page until the object has been rendered into all of the affected blocks.

Figure 1:
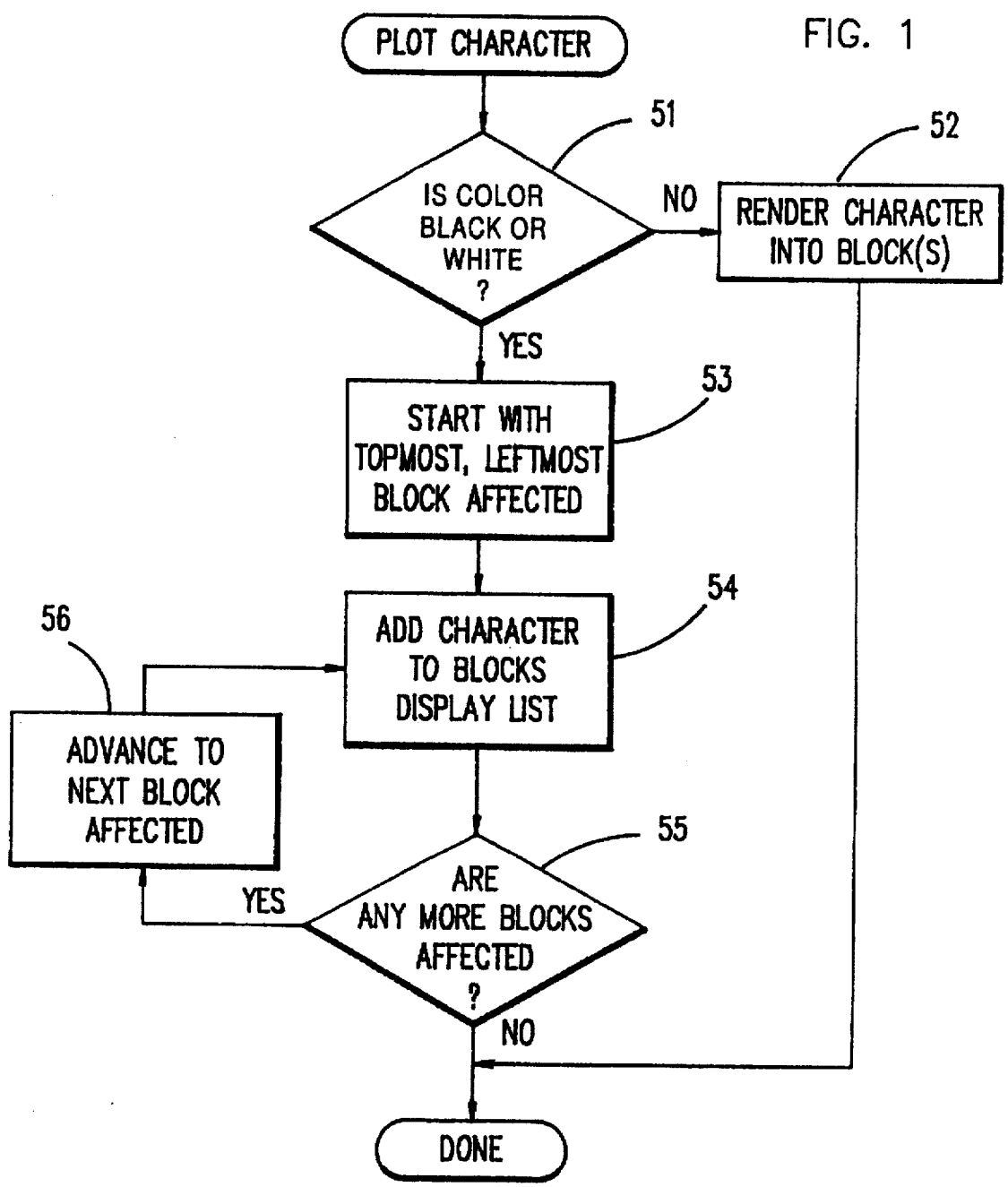
FIG. 1 is a flowchart of the routine for plotting a character in a block of a bit map.

Turning now to FIG. 1, the procedure for plotting a character is described. The processor first determines (51) if the "color" of the character is black or white. If not, the processor renders the character (52) into the affected blocks using the procedure just described with regard to FIG. 5. An example of a character not being black or white would be a character drawn with a given fill pattern.

If the color is black or white, the processor starts (53) with the topmost, leftmost block affected and adds (54) that character to the block's display list. The processor then determines (55) if any more blocks are affected, and advances (56) to the next affected block if there are further blocks affected. If there are no more blocks affected by the character being plotted, or if the character was neither black nor white, the "plot character" routine is completed.

Figure 6:
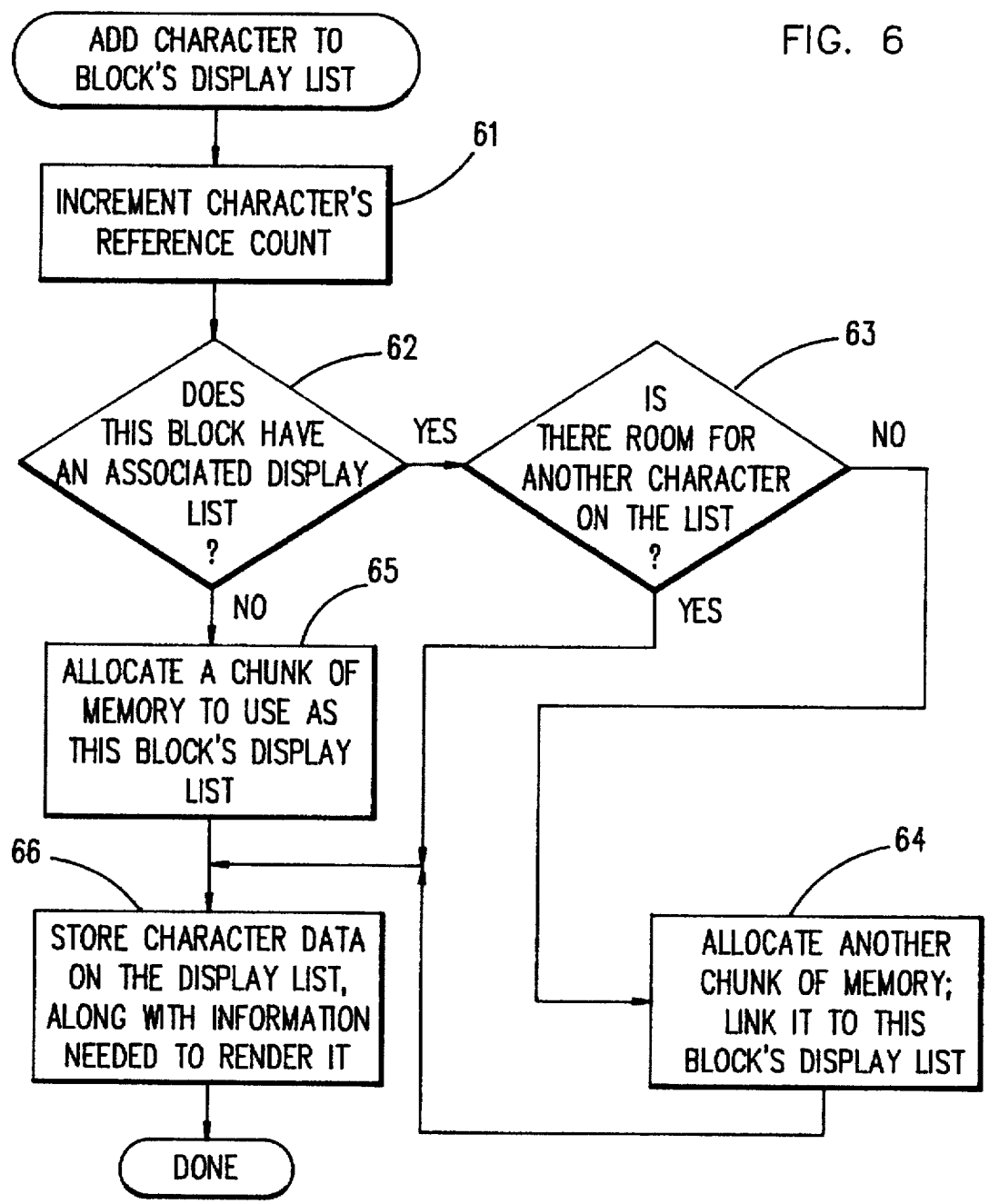
FIG. 6 is a flowchart of the routine for adding a character to a block's display list.

The routine for adding a character to a block's display list is shown in FIG. 6. To do this, the processor first increments (61) the character's reference count. This is a count maintained by the processor of the number of blocks affected by this particular character which is being added to one or more block's display list.

After incrementing the reference count, the processor determines (62) if the block under consideration has an associated display list. If so the processor must determine (63) if there is room for another character to be added to the display list. If not, the processor allocates (64) another area of memory for further display list entries and links it to this block's display list. In either event, the processor then proceeds to the input of the block 66 in the logic flow.

If there had been no display list associated with the block under consideration, the processor allocates (65) an area of memory to use as the block's display list, updates the display list pointer information, and then proceeds to the step 66.

In the step 66, the processor stores the character data on the display list together with the information which will be needed later during full rasterization of the block in order to render the character. This would typically be a pointer to a location in memory where the character data is stored, as well as position information for the character in the block and whether the character is black or white.

Figure 2:
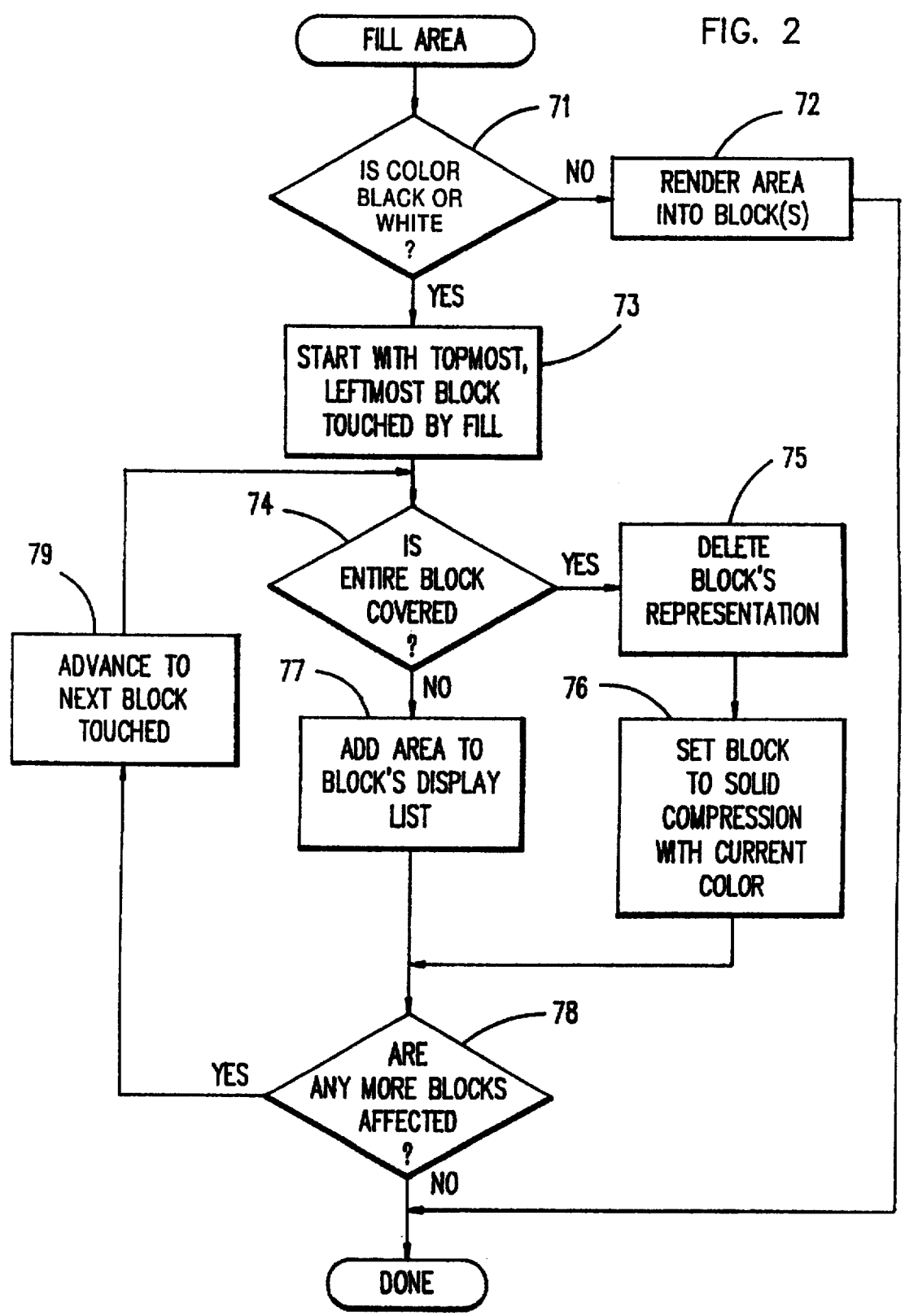
FIG. 2 is a flowchart of the routine for filling an area in a block of a bit map.

Turning now to FIG. 2, the procedure for filling an area of a block (the other "text" operation) is described. As in the case of plotting a character, the processor first determines (71) if the color of the fill pattern is black or white. If it is neither, the processor renders (72) the fill area into the block or blocks affected. If the color of the fill area is either black or white, the processor starts (73) with the topmost, leftmost block affected by the file area. The processor then determines (74) if the entire block is covered by the area. If so, the processor deletes (75) the block's representation, as will be described subsequently with regard to FIG. 12. In this case, after deleting the block's representation, the processor sets (76) the block to a solid complexion, with the current color, either black or white. The processor then moves to the decision point 78.

In the event that the processor determines (74) that the entire block is not covered by the area, the processor adds (77) the area to the block's display list. This operation will be described subsequently with regard to FIG. 7. The processor then reaches the decision point (78), and determines if there are any more blocks affected by the fill area. If so, the processor advances (79) to the next block and returns to the input of the decision point 74. If there are no more affected blocks, the routine is completed.

Figure 12:
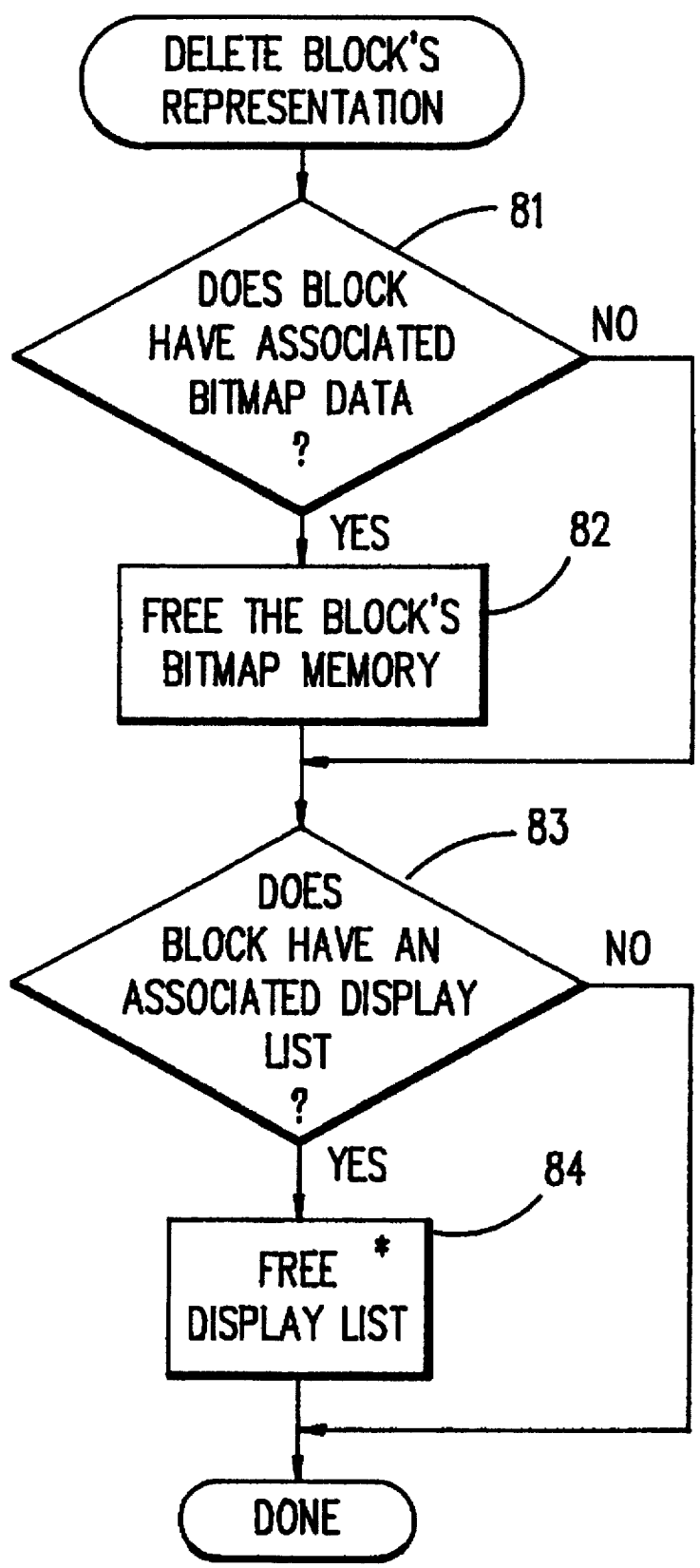
FIG. 12 is a flowchart of a routine for deleting a block's representation from memos.

Turning now to FIG. 12, if a block's representation is to be deleted (as called for in the step 75 of the fill area routine of FIG. 2), the processor first determines (81) if the block has associated bit map data. If so, the processor frees (82)

the block's bit map memory. After freeing any bit map memory necessary, the processor then determines (83) if the block has an associated display list. If so, the display list is freed (84). When this memory is freed, the compression type and pointers for the block to bit map memory and display list memory are reset, such as to zeroes. This completes the "delete block's representation" routine.

Figure 11:
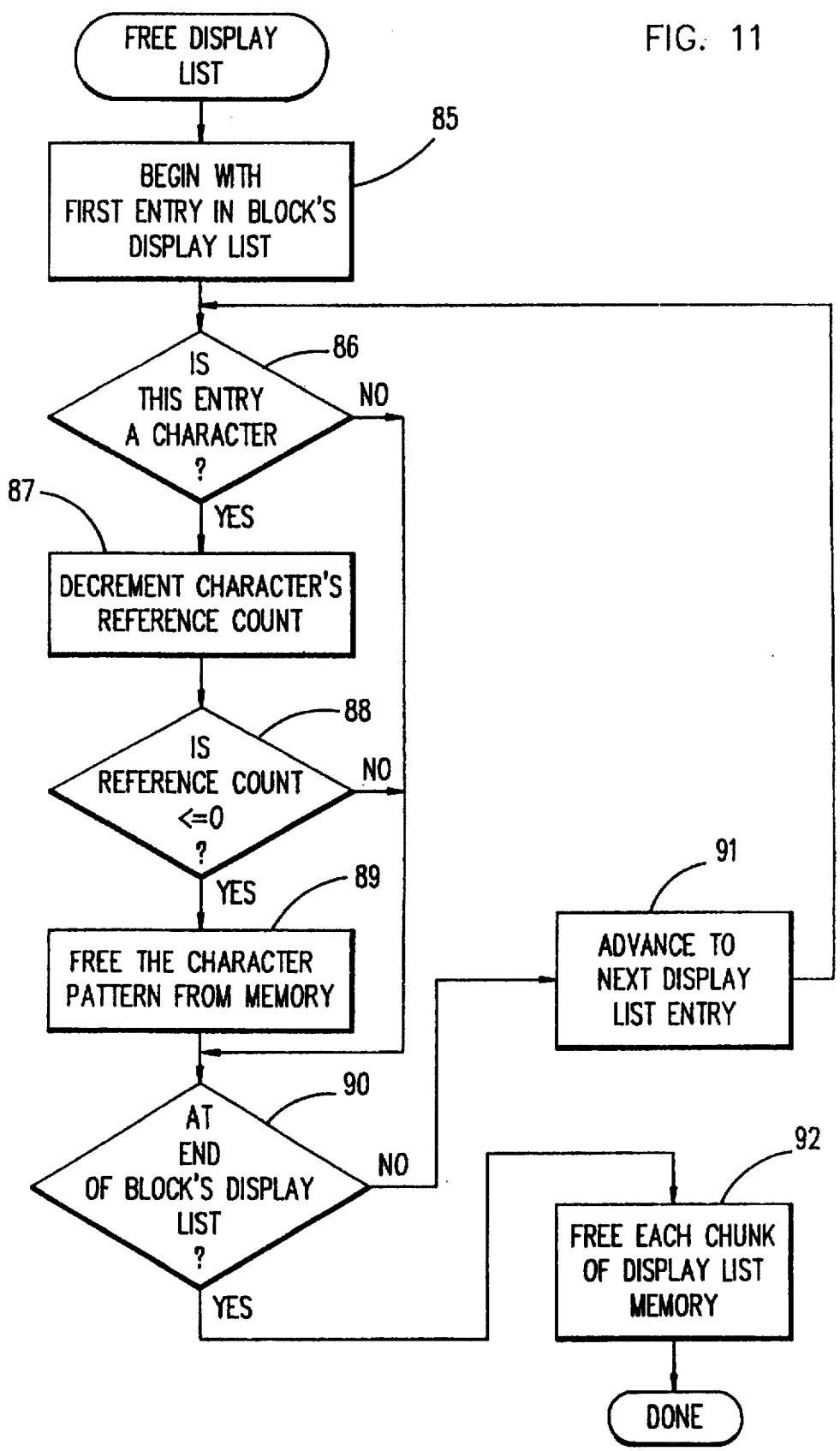
FIG. 11 is a flowchart of the routine for freeing display list memory.

The "free display list" operation (84) set forth in FIG. 12, and also at the step 40 in FIG. 5, is described with relation to FIG. 11. In order to free the display list for a particular block, the processor begins (85) with the first entry in the block's display list. The processor then determines (86) if this entry in the display list is a character. If the entry is a character, the processor decrements (87) the character's reference count. The processor then determines (88) if the reference count is less than or equal to zero. If so, the processor frees (89) the character pattern from memory. If the reference count is greater than zero, the processor leaves the character pattern in memory.

After decrementing the character's reference count, and freeing the character pattern from memory if appropriate, the processor then determines (90) if it is at the end of that block's display list. If not, the processor advances (91) to the next display list entry and returns to the entry point for the step 86. If the processor is at the end of the block's display list, the process frees (92) each part of memory making up the display list. In the present implementation, non-character "areas" of black or white are represented by parameters stored on the display list rather than another area of memory. Therefore, freeing the display list memory frees the memory used for defining such areas.

Figure 3:
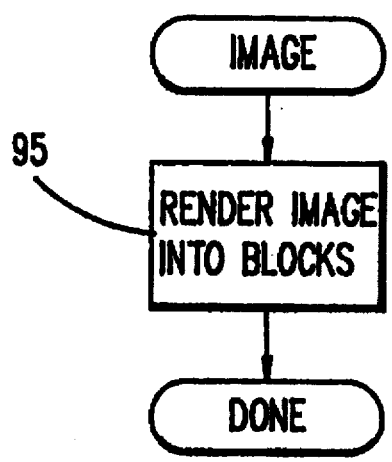
FIG. 3 is a flowchart of the routine for placing an image into a block of a bit map.
Figure 4:
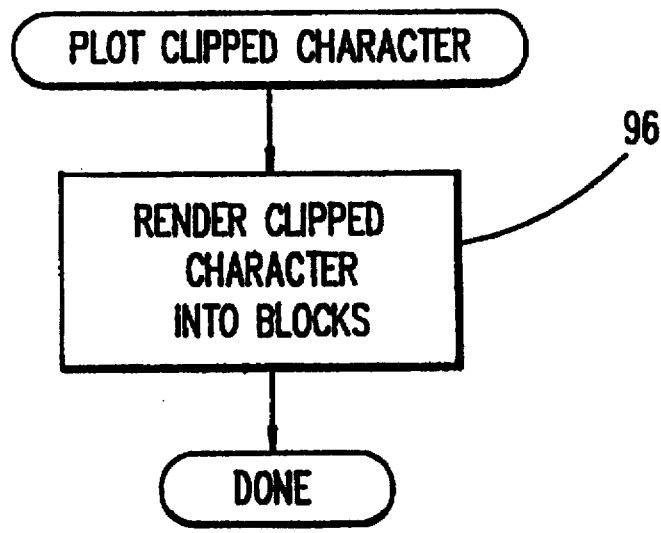
FIG. 4 is a flowchart of the routine for plotting a clipped character into a block of a bit map.

With reference now to FIG. 3, a bit map image is plotted into blocks, by rendering (95) the image into blocks, using the process set forth in FIG. 5. Similarly, a clipped character is plotted into blocks (FIG. 4) by rendering (96) the clipped character into blocks using the procedure set forth in FIG. 5.

Operations on uncompressed blocks occurring in the routines of FIGS. 1–4 are tracked to enable compression to be done, if necessary, on the least-recently used blocks. This is accomplished in the described system by maintaining a doubly linked list using pointers in the block data to the previously least-recently used block and the next least-recently used block.

Figure 7:
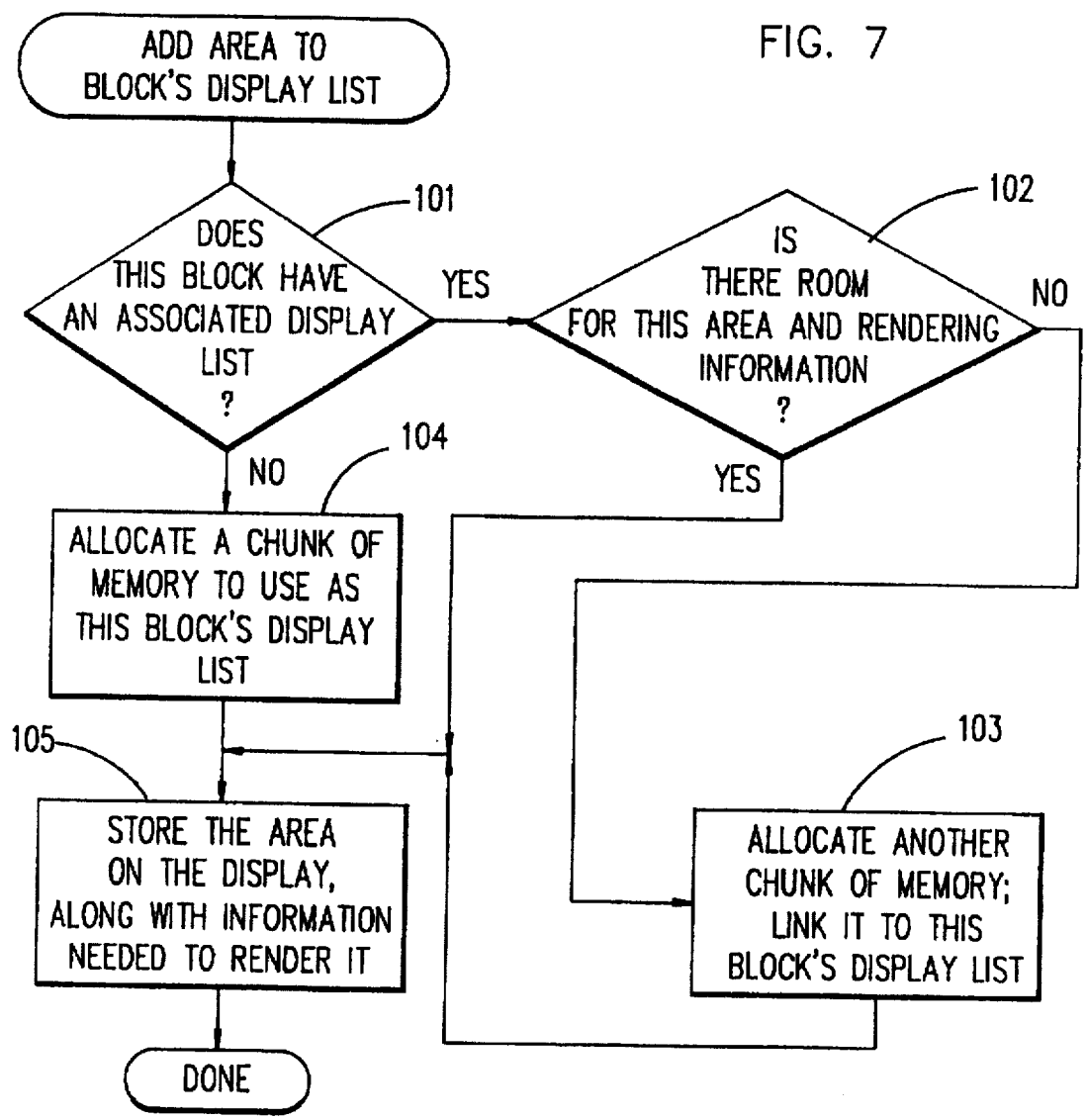
FIG. 7 is a flowchart of the routine for adding a fill area to a block's display list.

The routine for adding an area (non-character "text") to a block's display list, the step 77 of FIG. 2, is shown in FIG. 7. This is the case for adding fill area information to a block where the fill area is either black or white and covers less than the entire block. In order to do this, the processor first determines (101) if the block has an associated display list. If there is an associated display list, the processor determines (102) if there is room for this fill area and rendering information on the display list. If there is insufficient room, the processor allocates (103) another section of display list memory and links it to the block's display list. In the present implementation each display list area holds 32 items of information. Each item is generally a character designation or "area"-defining pieces of information. If, at the step 101, it has been determined that the block did not have an associated display list, the processor allocates (104) an area of memory to use as this block's display list. As in other cases where locations for bit map or display list memory are allocated or moved, the appropriate updates are made for a pointer or pointers in a table such as that of FIG. 15.

After the foregoing operations, once an adequate display list is established, the processor stores (105) the fill area on the display list, together with the information which will be needed to render it into the block. Such information may include line widths for the black or white area, position information, and/or rate of increase or decrease in width from scan line to scan line. This completes the "add area to block's display list" routine.

Figure 9:
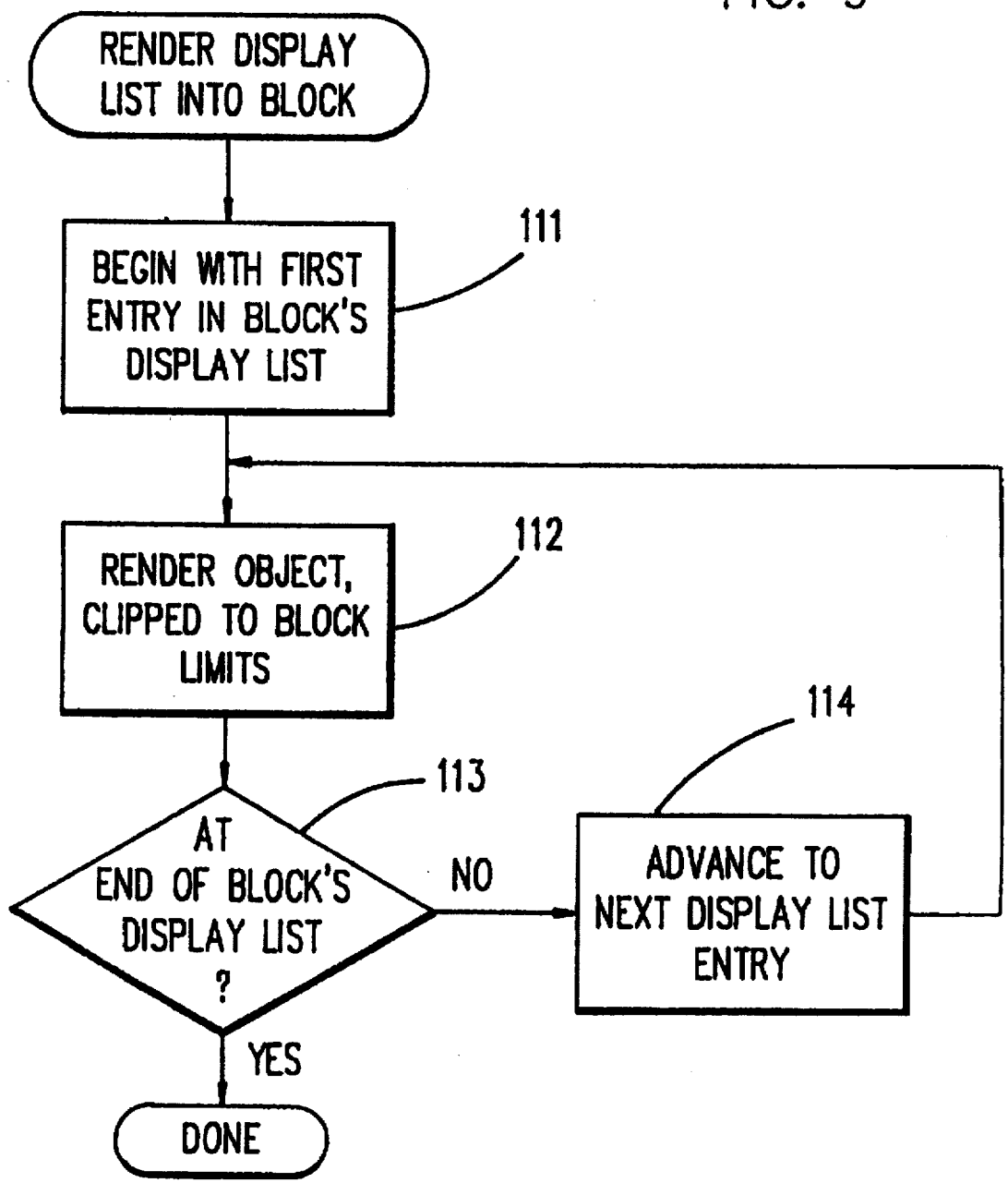
FIG. 9 is a flowchart of the routine for rendering a display list into a block of a bit map.

Turning now to FIG. 9, the "render display list into block" routine, the step 39 in FIG. 5, is described. This routine is required when an operation is being performed on a block which requires the display list commands to be rendered into the block before subsequent operations, such as rendering an object into the block, can be performed. In rendering the display list into the block, the processor begins (111) with the first entry on the block's display list. The processor then renders (112) the object associated with that entry on the display list into the block, clipped to the block's limits. For a character this means writing the character data from character memory into the bit map block at the proper location (with appropriate block boundary clipping). For an area this means placing the defined shape of black or white in the proper location in the block in accordance with the display list data. The processor then determines (113) if it is at the end of the block's display list. If not, the processor advances (114) to the next display list entry and returns to the step 112. Once the processor reaches the end of the display list, this completes the routine for rendering the display list into a block.

Figure 8:
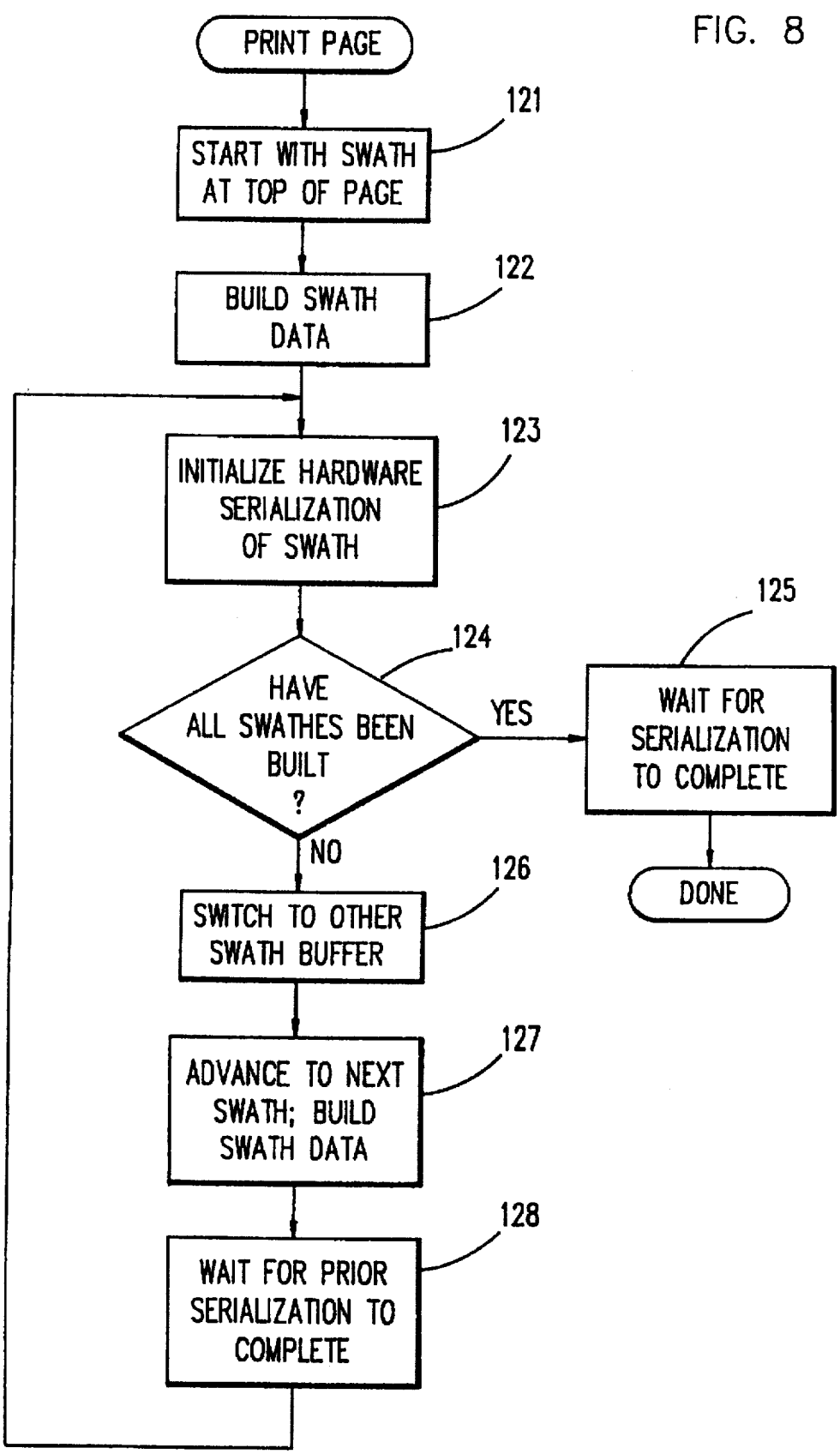
FIG. 8 is a flowchart of the routine for printing a page.

When it is time to produce a printed page, the "print page" routine of FIG. 8 is performed. In order to print a page, the processor starts (121) with a swath, or row of blocks, at the top of the page. The processor then builds swath data (122), as shall be described in more detail subsequently with reference to FIG. 10. In essence, this operation 122 serves to produce the bit map data for printing block by block across a swath, or row, on the page.

Returning to FIG. 8, after the swath data is built in the step 122, the processor initializes the DMA hardware, logic circuits, etc., for serialization of the bit data from the swath to the print engine.

After the hardware is initialized, the processor determines (124) if all swaths for the page to be printed have been built. If so, the processor waits (125) for serialization to be completed.

Figure 10:
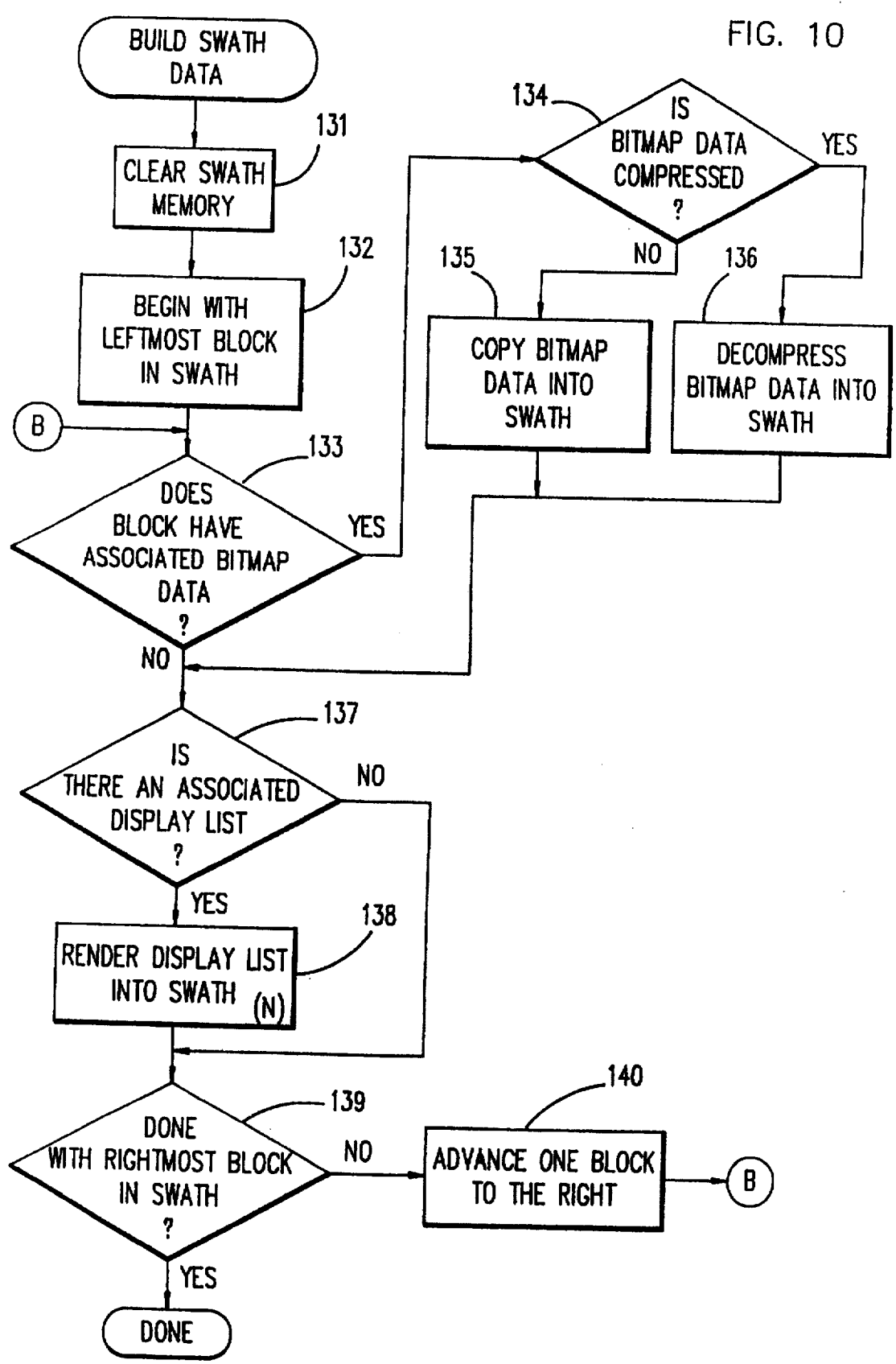
FIG. 10 is a flowchart of the routine for building swath data.

If all swaths for the page have not been built, the processor switches (126) to another swath buffer area in memory and advances (127) to the next swath, building swath data as shall be described with respect to FIG. 10. The processor then waits (128) for prior serialization to be completed and returns to the step 123.

The routine to "build swath data", as used in the "print page" routine of FIG. 8, is shown in FIG. 10. In order to build the data for a swath, the processor first clears (131) a section of swath memory and begins with the leftmost block in the swath (132). The processor then determines (133) if the block has associated bit map data. If so, the processor further determines (134) if the bit map data is compressed. If the bit map data is not compressed, the bit map data is copied (135) into the swath. If the bit map data is compressed, the processor decompresses (136) the bit map data and places it into the swath.

After the bit map data, if any, has been placed into the swath, the processor then determines (137) if there is a display list associated with the block. If so, this display list is rendered (138) into the swath.

Decompressing bit map data into the swath (136) and rendering the display list into the swath (138) are similar to decompressing and rendering blocks (FIG. 5, blocks 36 and 39), but the compressed data and display list are not immediately freed as in FIG. 5, blocks 37 and 40. Rather, the data is saved in case the page needs to be reprinted, for example due to a paper jam. These steps occur when the data is no longer needed, usually when the page reaches the exit tray.

After completing a block, the processor determines (139) if it is finished with the rightmost block in the current swath. If so the routine is completed, and if not the processor advances (140) one block to the right and returns to the step 133.

Block structures have been described herein for the implementation of a form of the invention. Block types and structures, and the form of information associated with a block, can be varied. For example, a block type may be defined to fully or partially hold a rectangular fill pattern. Such a block might be defined by coordinates in the block for the boundaries of the fill pattern and a pointer to the fill pattern data stored in memory.

I claim:

1. A printer including a print engine for printing pages which have a width and a length, comprising:
   means for defining, for a page to be printed, a page bit map in sections with multiple sections across the width of the page and multiple sections down the length of the page;
   means for receiving drawing orders defining objects for the page to be printed;
   means for rendering some of the objects defined by the drawing orders into the sections of the bit map;
   means for storing some of the drawing orders in display lists, each display list having an associated section of the bit map; and
   means for rasterizing groups of sections of the bit map, including rendering the display lists, for serialization of the groups of sections of the bit map to the print engine.

2. The printer of claim 1 in which the bit map sections are rectangular bit map blocks arranged in rows.

3. The printer of claim 2 in which the groups of sections of the bit map which are rasterized for serialization are rows of blocks of the bit map.

4. The printer of claim 3 in which the printer further comprises a programmed microprocessor and associated memory accessible by the microprocessor for storing the bit map blocks and the display lists.

5. The system of claim 1 in which the means for rasterizing groups of sections of the bit map for serialization is in an apparatus separate from said means for defining a page bit map, said means for receiving orders, said means for rendering some of the objects and said means for storing some of the orders.

6. The system of claim 1 in which the means for storing some of the orders in display lists comprises means for storing character designations in said display lists.

7. The system of claim 1 which further comprises means for freeing memory used to store a display list after the display list has been rendered into a section of the bit map.

8. The system of claim 1 which further comprises means for compressing selected sections of the bit map when there is insufficient memory to store bit map representations of all sections for a page.

9. The system of claim 8, in which the means for compressing comprises means for compressing the least recently used sections of the bit map.

10. The printer of claim 1, wherein said drawing orders are received as a print data stream which defines the objects which are to be rendered into the bit map sections for the page to be printed by said means for rendering and by said means for rasterizing.

11. The printer of claim 1, wherein said means for rendering completely renders a first portion of a first object in a first section prior to rendering a second portion of said first object in a second section.

* * * * *